US012617251B2

(12) United States Patent
Liu et al.

(10) Patent No.: US 12,617,251 B2
(45) Date of Patent: May 5, 2026

(54) POWER DRIVE SYSTEM AND VEHICLE

(71) Applicant: CONTEMPORARY AMPEREX TECHNOLOGY (HONG KONG) LIMITED, Hong Kong (CN)

(72) Inventors: Yao Liu, Ningde (CN); Liwen Jiang, Ningde (CN); Kai Wu, Ningde (CN); Hongguang Shi, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 245 days.

(21) Appl. No.: 18/238,530

(22) Filed: Aug. 28, 2023

(65) Prior Publication Data

US 2023/0398832 A1    Dec. 14, 2023

Related U.S. Application Data

(63) Continuation of application No. PCT/CN2021/132905, filed on Nov. 24, 2021.

(51) Int. Cl.
| | |
|---|---|
| *B60H 1/00* | (2006.01) |
| *B60K 1/02* | (2006.01) |
| *B60K 17/28* | (2006.01) |

(52) U.S. Cl.
CPC ....... *B60H 1/00392* (2013.01); *B60H 1/0045* (2013.01); *B60K 1/02* (2013.01); *B60K 17/28* (2013.01)

(58) Field of Classification Search
CPC .... B60H 1/00392; B60H 1/0045; B60K 1/02; B60K 17/28; B60K 25/00; B60K 25/02;
(Continued)

(56) References Cited

U.S. PATENT DOCUMENTS

| | | | |
|---|---|---|---|
| 2001/0039230 A1* | 11/2001 | Severinsky | F02B 37/18 |
| | | | 180/65.23 |
| 2012/0221197 A1 | 8/2012 | Hisada et al. | |

(Continued)

FOREIGN PATENT DOCUMENTS

| | | |
|---|---|---|
| CN | 101797884 A | 8/2010 |
| CN | 102195840 A | 9/2011 |

(Continued)

OTHER PUBLICATIONS

International Search Report and Written Opinion mailed on May 6, 2022, received for PCT Application PCT/CN2021/132905, filed on Nov. 24, 2021, 9 pages including English Translation.

(Continued)

*Primary Examiner* — Marc E Norman
(74) *Attorney, Agent, or Firm* — XSENSUS LLP

(57) ABSTRACT

Disclosed are a power drive system and a vehicle. The power drive system may include a first motor, a second motor, a first clutch, a transmission device, and an air conditioning compressor; the first motor may be in transmission connection to the air conditioning compressor via a first transmission path, and may be in transmission connection to the transmission device via a second transmission path; the second motor may be in transmission connection to the air conditioning compressor; and the first clutch may be disposed on the first transmission path for connection or disconnection of the first transmission path.

11 Claims, 4 Drawing Sheets

(58) Field of Classification Search
     CPC ........ B60K 2001/001; B60K 2025/005; B60Y
                                                  2025/005
     See application file for complete search history.

(56)                    References Cited

U.S. PATENT DOCUMENTS

| | | | |
|---|---|---|---|
| 2015/0158483 | A1 | 6/2015 | Dalum et al. |
| 2021/0291646 | A1* | 9/2021 | Lorenz ................... B60K 23/04 |

FOREIGN PATENT DOCUMENTS

| | | |
|---|---|---|
| CN | 102390260 A | 3/2012 |
| JP | 2005-512492 A | 4/2005 |
| WO | 03/049965 A1 | 6/2003 |
| WO | 2018/059118 A1 | 4/2018 |

OTHER PUBLICATIONS

Extended European Search Report issued Jun. 6, 2024 in European
Patent Application No. 21965090.0.

* cited by examiner

POWER DRIVE SYSTEM AND VEHICLE

CROSS-REFERENCE TO RELATED APPLICATION

The present application is a continuation of an International Patent Application No. PCT/CN2021/132905 filed on Nov. 24, 2021, the entire contents of which are incorporated herein by reference.

TECHNICAL FIELD

The present application relates to the technical field of electric vehicles, in particular to a power drive system and a vehicle.

BACKGROUND

At present, in the field of automotive industry, new energy vehicles have become a new trend of development, such as electric vehicles. Batteries are widely used to supply energy to electric vehicles for driving drive wheels and an air conditioning compressor of a vehicle to run. How to control the drive wheels and the air conditioning compressor to flexibly run to reduce energy consumption as much as possible on the premise of meeting requirements is one of the important research and development directions in this field.

SUMMARY

The present application aims to provide a power drive system and a vehicle for flexible energy supply and reduction of energy consumption.

Embodiments of the present application are implemented as follows:

In a first aspect, an embodiment of the present application provides a power drive system. The power drive system includes: a first motor, a second motor, a first clutch, a transmission device, and an air conditioning compressor, the first motor being in transmission connection to the air conditioning compressor via a first transmission path, the second motor also being in transmission connection to the air conditioning compressor; the first motor being further in transmission connection to the transmission device via a second transmission path for transmitting power of the first motor to drive wheels of a vehicle; the first clutch being disposed on the first transmission path for connection or disconnection of the first transmission path.

In an existing power drive system, drive wheels and an air conditioning compressor are driven by a motor simultaneously, and the air conditioning compressor is driven simultaneously on the premise of ensuring the operation of the drive wheels, such that a rotation speed of the air conditioning compressor may only change with a traveling speed of the vehicle, which makes it difficult to regulate the rotation speed of the air conditioning compressor according to a temperature regulation requirement. Sometimes there is unnecessary energy consumption higher than the temperature regulation requirement, and sometimes a high temperature regulation requirement may not be met due to a low traveling requirement. In the technical solution of the present application, the first motor is connected to the air conditioning compressor via the first transmission path, and is connected to the transmission device via the second transmission path, the first clutch is disposed on the first transmission path, and meanwhile, the air conditioning compressor is further in transmission connection to the second motor. In this way, when high-speed traveling is required but the temperature regulation requirement is low, the first transmission path is disconnected through the first clutch, the first motor only drives the drive wheels, and the second motor drives or does not drive the air conditioning compressor according to the requirement to avoid unnecessary energy consumption. When there is the temperature regulation requirement but no traveling requirement, the first transmission path is disconnected through the first clutch, the first motor stops operating and rests to reduce energy consumption, and the second motor drives the air conditioning compressor to run at different rotation speeds according to the requirement to meet the temperature regulation requirement. When high-speed traveling is required and there is the high temperature regulation requirement, the first transmission path is connected through the first clutch, the drive wheels and the air conditioning compressor are driven through the first motor, and the second motor stops operating to reduce energy consumption. In other words, the drive system according to the present application may be flexibly deployed according to the traveling requirement and the temperature regulation requirement to provide a suitable drive force, thereby achieving a desirable energy-saving effect.

In some embodiments of the present application, a rate of work of the first motor is greater than a rate of work of the second motor.

In the above technical solution, when the temperature regulation requirement is high, the first motor with the high rate of work directly drives the air conditioning compressor, which not only meets the high temperature regulation requirement, but also allows the second motor to be provided as a motor with the low rate of work. By reducing the rate of work, the size, weight and cost of the second motor are remarkably reduced, and the operation energy consumption of the second motor is low, thereby having a desirable energy-saving effect. In this way, the first motor may drive the air conditioning compressor to run at a high speed, and the second motor may drive the air conditioning compressor to run at a low speed. By switching the first motor and the second motor to drive the air conditioning compressor respectively, primary speed regulation of the air conditioning compressor is achieved. When the second motor drives the air conditioning compressor independently, the air conditioning compressor may be further decelerated according to the temperature regulation requirement, thereby achieving secondary speed regulation. Thus, the air conditioning compressor is regulated and controlled as flexibly as possible to meet the temperature regulation requirement and reduce unnecessary energy consumption. In another aspect, the second motor stops operating and rests in a case of the high temperature regulation requirement, thereby reducing wear of the second motor and extending the durability of the second motor.

In some embodiments of the present application, the power drive system further includes a second clutch, and the second clutch is disposed in the second transmission path for connection or disconnection of the second transmission path.

In the above technical solution, when the second clutch is disengaged, the first motor may drive the air conditioning compressor independently without driving the drive wheels, such that the high temperature regulation requirement is met when the vehicle does not need to travel, unnecessary energy consumption caused by operation of the drive wheels is reduced, and the energy-saving effect is achieved.

In some embodiments of the present application, the first transmission path includes a first connection portion and a second connection portion that may be connected or disconnected through the first clutch, the first connection portion is in transmission connection to an output end of the first motor, and the second connection portion is in transmission connection to an input end of the air conditioning compressor; and the second transmission path includes a third connection portion and a fourth connection portion that may be connected or disconnected through the second clutch, the third connection portion is in transmission connection to the output end of the first motor, and the fourth connection portion is in transmission connection to an input end of the transmission device.

In the above technical solution, the transmission paths are simple, and the first motor may drive at least one of the air conditioning compressor and the drive wheels, which may meet the high temperature regulation requirement independently and may also meet the traveling requirement independently.

In some embodiments of the present application, the first motor includes a first output end and a second output end, the first output end is connected to the first connection portion, and the second output end is connected to the third connection portion.

In the above technical solution, the first motor has dual output ends, the first output end drives the air conditioning compressor via the first transmission path, and the second output end drives the drive wheels via the second transmission path. The connection structure is simple, the transmission paths are clear, and control is easy.

In some embodiments of the present application, the first connection portion and the third connection portion are interconnected or integrally formed.

In the above technical solution, the first motor is provided with one output end, and the first connection portion and the third connection portion are integrated so as to be connected to the output end of the first motor simultaneously, such that the connection structure is simplified, and flexible regulation and control over the drive wheels and the air conditioning compressor are not affected.

In some embodiments of the present application, the second connection portion is in transmission connection to the input end of the air conditioning compressor through the second motor, or, the air conditioning compressor includes a first input end and a second input end, the first input end is connected to the second connection portion, and the second input end is connected to the second motor.

In the above technical solution, the first motor and the second motor may drive the air conditioning compressor independently, respectively, or drive the air conditioning compressor together. Moreover, when the second connection portion is in transmission connection to the input end of the air conditioning compressor through the second motor, the second motor may also drive the drive wheels to rotate in cooperation with the first motor, and the power drive system is flexible in regulation and control.

In some embodiments of the present application, the power drive system has a first operating mode; and in the first operating mode, the first motor operates, the second motor does not operate, the first clutch is disengaged, the second clutch is engaged, the first motor drives the drive wheels, and the air conditioning compressor does not run.

In the above technical solution, in the first operating mode, there is no temperature regulation requirement, the vehicle is driven only by the first motor, and neither the second motor nor the air conditioning compressor runs, thereby reducing energy consumption.

In some embodiments of the present application, the power drive system has a second operating mode; and in the second operating mode, the first motor operates, the second motor does not operate, both the first clutch and the second clutch are engaged, and the first motor drives the drive wheels and the air conditioning compressor.

In the above technical solution, in the second operating mode, there is the high temperature regulation requirement, the first motor simultaneously drives the air conditioning compressor and the drive wheels to run at a high speed, and the second motor does not run, thereby relieving wear and reducing energy consumption.

In some embodiments of the present application, the power drive system has a third operating model; and in the third operating mode, both the first motor and the second motor operate, the first clutch is disengaged, the second clutch is engaged, the first motor drives the drive wheels, and the second motor drives the air conditioning compressor.

In the above technical solution, in the third operating mode, the temperature regulation requirement is low, the first motor drives the drive wheels to run at a high speed, and the second motor drives the air conditioning compressor to run at a relatively low speed, thereby adapting to the temperature regulation requirement and reducing unnecessary energy consumption.

In some embodiments of the present application, the power drive system has a fourth operating mode; and in the fourth operating mode, the first motor operates, the second motor does not operate, the first clutch is engaged, the second clutch is disengaged, and the first motor drives the air conditioning compressor.

In the above technical solution, in the fourth operating mode, the vehicle may perform fast charging on a battery when parked. The battery generates more heat during fast charging. By making the first motor drive only the air conditioning compressor to run at a high speed, fast cooling is achieved. At present, in order to achieve cooling of the battery during fast charging, the air conditioning compressor needs to have a high rate of work, or a plurality of air conditioning compressors are provided to run synchronously, which results in a large size and high weight, cost and energy consumption of a product. In the above technical solution, the cooling requirement is met by driving the air conditioning compressor to run at a high speed through the first motor with the high rate of work, thereby effectively reducing the size, weight, cost and energy consumption of the product.

In one embodiment of the present application, the power drive system has a fifth operating mode; and in the fifth operating mode, the first motor does not operate, the second motor operates, both the first clutch and the second clutch are disengaged, and the second motor drives the air conditioning compressor.

In the above technical solution, in the fifth operating mode, the vehicle is parked, the temperature regulation requirement in a compartment is met, the second motor has low energy consumption, and flexible speed regulation is achieved.

In a second aspect, an embodiment of the present application provides a vehicle. The vehicle includes the above-mentioned power drive system.

BRIEF DESCRIPTION OF DRAWINGS

In order to more clearly describe the technical solutions in embodiments of the present application, the drawings that are to be referred for the embodiments will be briefly described hereinafter. It is to be understood that the drawings described hereinafter merely illustrate some embodiments of the present application and thus should not be regarded as limiting the scope, and a person of ordinary skill in the art may also derive other relevant drawings based on the drawings described herein without any creative effort.

REFERENCE NUMERALS

Figures 1, 2:
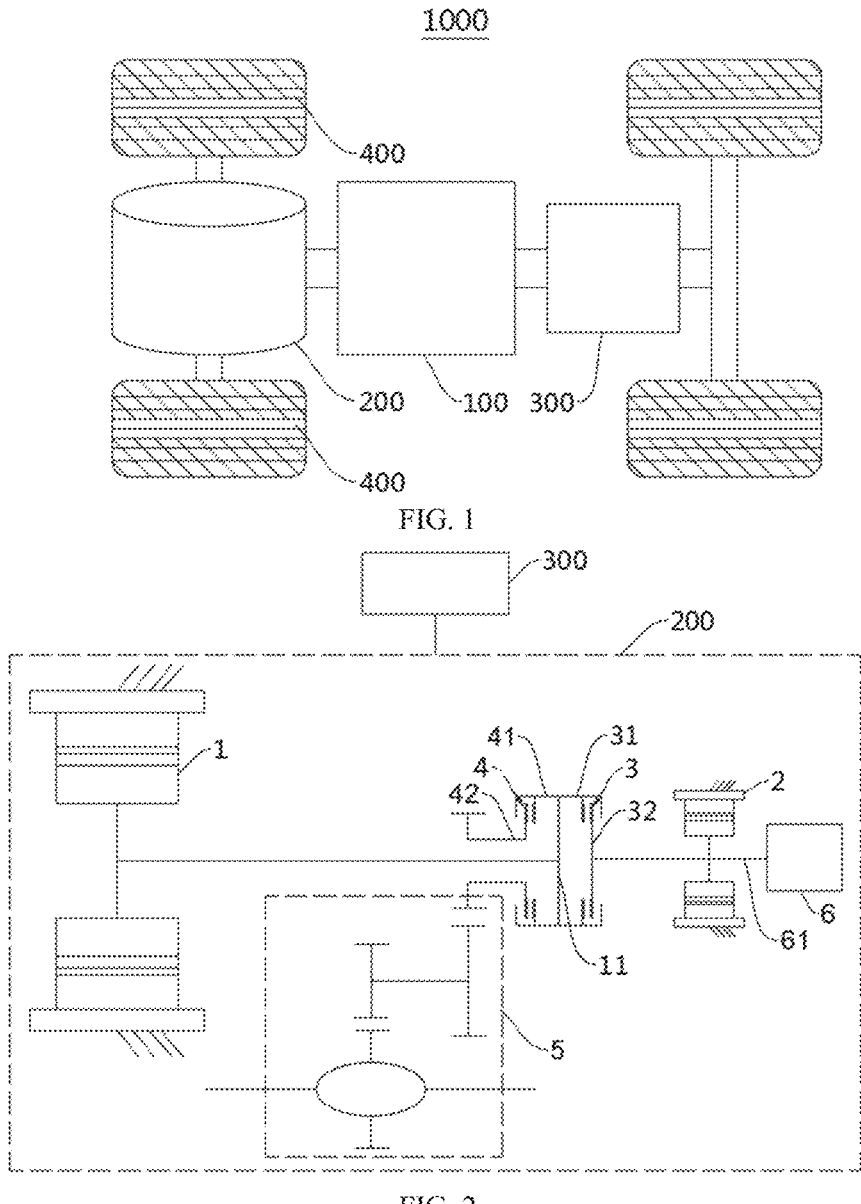
FIG. 1 is a schematic structural diagram of a vehicle according to an embodiment of the present application.
FIG. 2 is a schematic structural diagram (a state diagram of a fifth operating mode of a power drive system) of the power drive system according to an embodiment of the present application.

1000—Vehicle; 100—Battery; 200—Power drive system; 300—Controller; 400—Drive wheel; 1—First motor; 11—Output end of the first motor; 11a—First output end; 11b—Second output end; 2—Second motor; 3—First clutch; 31—First connection portion; 32—Second connection portion; 4—Second clutch; 41—Third connection portion; 42—Fourth connection portion; 5—Transmission device; 6—Air conditioning compressor; 61—Input end of the air conditioning compressor; 61a—First input end; 61b—Second input end; and 7—Third clutch.

DETAILED DESCRIPTION OF EMBODIMENTS

In order to make the objective, technical solutions and advantages of the embodiments of the present application clearer, the technical solutions in the embodiments of the present application will be clearly described below in conjunction with the accompanying drawings in the embodiments of the present application. Apparently, the described embodiments are a part of the embodiments of the present application, rather than all of the embodiments. Based on the embodiments of the present application, all other embodiments obtained by a person of ordinary skill in the art without any creative effort fall within the scope of protection of the present application.

Unless otherwise defined, all technical and scientific terms used in the present application have the same meanings as are commonly understood by those skilled in the art of the present application. Terms used in the specification of the present application are merely for the purpose of describing specific embodiments and are not intended to limit the present application. The terms "comprise" and "have" and any variations thereof in the specification and claims of the present application and the above description of the drawings are intended to cover non-exclusive inclusion. The terms "first", "second", etc. in the specification and the claims of the present application or in the accompanying drawings above are used to distinguish between different objects and are not intended to describe a particular order or relationship of precedence.

"Embodiment" referred to in the present application means that particular features, structures, or characteristics described in conjunction with embodiments may be included in at least one of the embodiments of the present application. The presence of the phrase in various places in the precedence does not necessarily mean the same embodiment, nor is it a separate or alternative embodiment that is mutually exclusive with other embodiments.

In the description of the present application, it is to be noted that the terms "mount", "connected", "connect" and "attached" are to be understood in a broad sense, unless otherwise expressly specified and limited, for example, it may be a fixed connection, or a removable connection, or an integral connection; it may be a direct connection, or an indirect connection via an intermediate medium, and it may be internal communication of two elements. To a person of ordinary skill in the art, the specific meaning of the above terms in the present application may be understood according to specific situations.

The term "and/or" in the present application is simply a description of the association relationship of the associated objects, indicating that three relationships may exist, for example, A and/or B may indicate that: A exists alone, A and B exist at the same time, and B exists alone. In addition, the character "/" in the present application generally means that the associated objects are in an "or" relationship.

In embodiments of the present application, the same reference numerals indicate the same components, and detailed descriptions of the same components are omitted in different embodiments for the sake of brevity. It is to be understood that the thickness, length, width, etc. of the various components in the embodiments of the present application illustrated in the accompanying drawings as well as the overall thickness, length, width, etc. of an integrated device are illustrative merely and may not constitute any limitation to the present application.

With the increasing requirements of energy conservation and emission reduction, new energy vehicles have become a new development trend of the automobile industry, such as electric vehicles, whose energy storage power source is battery. A power drive system of an electric vehicle includes a motor, a motor controller, a transmission device, wheels and so on. The motor controller receives output signals from an accelerator pedal, a brake pedal, and a gear control handle, controls rotation of the motor, and drives the drive wheels through the transmission device. In the electric vehicle, the motor not only drives the wheels to run, but also drives a thermal management device to run, for example, driving an air conditioning compressor to run.

In order to ensure the vehicle power, the motor is generally mainly used to ensure the operation of the drive wheels, and drives the air conditioning compressor to rotate simultaneously, such that a rotation speed of the air conditioning compressor may only change with a traveling speed of the vehicle, and it is not easy to match the rotation speed of the air conditioning compressor with a temperature regulation requirement. Sometimes the rotation speed is greater than the temperature regulation requirement, resulting in unnecessary energy consumption, and sometimes the rotation speed is less than the temperature regulation requirement, thereby failing to meet the usage requirement. How to control the drive wheels and the air conditioning compressor to flexibly run to meet a traveling requirement and the temperature regulation requirement of the vehicle simultaneously and reduce energy consumption as much as possible is one of the important research and development directions in this field.

In view of this, the present application provides a power drive system. The power drive system includes a first motor, a second motor, a first clutch, a transmission device 5, and an air conditioning compressor. The first motor is in transmission connection to the air conditioning compressor via a first transmission path, and the second motor is also in transmission connection to the air conditioning compressor. The first motor is further in transmission connection to the transmission device via a second transmission path for transmitting power of the first motor to drive wheels of a vehicle. The first clutch is disposed on the first transmission path for connection or disconnection of the first transmission path.

In the power drive system according to the present application, when the first clutch is controlled to connect the first transmission path, the first motor drives the drive wheels and the air conditioning compressor simultaneously, and the second motor may stop operating and rest, thereby reducing the quantity of operating components and playing roles in saving energy and protecting the second motor. When the first clutch 3 is controlled to disconnect the first transmission path, the second motor drives the air conditioning compressor independently, in this case, the first motor is only used for driving the drive wheels, and the second motor is only used for driving the air conditioning compressor, thereby achieving independent operation of the drive wheels and the air conditioning compressor. The second motor may be controlled according to a temperature regulation requirement to regulate a rotation speed of the air conditioning compressor.

In this way, the rotation speed of the air conditioning compressor does not necessarily change with a traveling speed of the vehicle, thereby controlling the drive wheels and the air conditioning compressor to run flexibly and achieving a desirable energy-saving effect. For example, when high-speed traveling is required but the temperature regulation requirement is low, the first transmission path is disconnected through the first clutch, the first motor only drives the drive wheels, and the second motor drives or does not drive the air conditioning compressor according to the requirement to avoid unnecessary energy consumption. When there is the temperature regulation requirement but no traveling requirement, the first transmission path is disconnected through the first clutch, the first motor stops operating and rests to reduce energy consumption, and the second motor drives the air conditioning compressor according to the requirement to meet the temperature regulation requirement. When high-speed traveling is required and there is a high temperature regulation requirement, the first transmission path is connected through the first clutch, the drive wheels and the air conditioning compressor are driven through the first motor, and the second motor stops operating to reduce energy consumption.

The power drive system according to the embodiment of the present application may be, but is not limited to, used for vehicles, and may also be used for ships, aircrafts and other electric devices, such as electric ships, spacecrafts, electric toys, electric tools, and the like. The electric toys may include game machines, electric car toys, electric ship toys, electric aircraft toys, etc. The electric tools may include electric machine tools, electric sweepers, etc. The spacecrafts may include aircrafts, rockets, space shuttles, spaceships, etc.

The following takes the electric device being a vehicle as an example for illustration.

As shown in FIG. 1, the vehicle 1000 may be a pure electric vehicle, a hybrid vehicle, or an extended program vehicle, etc. A battery 100, a controller 300, and a power drive system 200 may be disposed inside the vehicle 1000. The controller 300 is used for controlling the battery 100 to supply electricity to the power drive system 200. For example, the battery 100 may be disposed at a bottom or front or rear of the vehicle 1000. The battery 100 may be used for supplying electricity to the vehicle 1000. For example, the battery 100 may be used as an operation electricity source of the vehicle 1000 to be used for a circuit system of the vehicle 1000, for example, used for operation electricity requirements of the vehicle 1000 during startup, navigation and running. Meanwhile, the battery 100 may not only serve as the operation electricity source of the vehicle 1000, but may also serve as a drive electricity source of the vehicle 1000 to replace or partially replace fuel oil or natural gas to provide drive force for the power drive system 200 of the vehicle 1000.

As shown in FIG. 2, the power drive system 200 includes a first motor 1, a second motor 2, a first clutch 3, a transmission device 5, and an air conditioning compressor 6. The first motor 1 is in transmission connection to the air conditioning compressor 6 via a first transmission path, and the second motor 2 is also in transmission connection to the air conditioning compressor 6. The first motor 1 is further in transmission connection to the transmission device 5 via a second transmission path for transmitting power of the first motor 1 to drive wheels 400 of the vehicle 1000. The first clutch 3 is disposed on the first transmission path for connection or disconnection of the first transmission path.

The drive wheels 400 are subjected to forward ground friction and are wheels that provide drive force for traveling of the vehicle 1000. The drive wheels 400 are connected to the power drive system 200 through the transmission device 5 to obtain the drive force.

The transmission device 5 is a device formed by a series of a crankshaft, a flywheel, a transmission, a transmission shaft, a reducer, a differential, a semi-axle, etc. having elasticity and rotational inertia, and is used for transmitting the power from the first motor 1 to the drive wheels 400. For example, the power is output by the first motor 1, and is transmitted to the drive wheels 400 through the transmission shaft, the reducer, the differential, and the semi-axle after the transmission increases the torque and changes a speed.

In the power drive system 200, the first motor 1 is a component that mainly provides drive force for the vehicle 1000. The first motor 1 is connected to the air conditioning compressor 6 via the first transmission path, and is connected to the drive wheels 400 via the second transmission path.

The first clutch 3 is a component that connects a driving part with a driven part of the first transmission path and used for cutting off or transmitting the power. The first clutch 3 is disposed on the first transmission path. When the first clutch 3 is engaged, the first motor 1 transmits power to the air conditioning compressor 6 via the first transmission path. When the first clutch 3 is disengaged, the first transmission path is disconnected and the first motor 1 may not transmit power to the air conditioning compressor 6.

The second motor 2 is a component used for assisting the first motor 1. The second motor 2 is also in transmission connection to the air conditioning compressor 6, and therefore may also drive the air conditioning compressor 6 to rotate.

The air conditioning compressor 6 may be connected to an air conditioning system of a compartment and a thermal management system of the battery 100. The compartment refers to a space for the vehicle 1000 to carry people or cargos. The thermal management system of the battery 100 is used for regulating heat of the battery 100 by heat exchange to reduce the risk of ignition and explosion of the battery 100 caused by an overhigh temperature or an uneven temperature. The greater the rotation speed of the air conditioning compressor 6, the greater the cooling capacity of the air conditioning system and the thermal management system and the more energy consumed.

The temperature regulation requirement mentioned in the present application refers to a cooling requirement and a heating requirement of the compartment as well as a cooling requirement and a heating requirement of the battery 100. A high temperature regulation requirement indicates that a temperature difference to be changed is high and more heat needs to be absorbed or provided; and a low temperature regulation requirement indicates that a temperature difference to be changed is low and less heat needs to be absorbed or provided.

In this way, by controlling the first clutch 3, the first motor 1 and the second motor 2, on the one hand, the first transmission path may be connected, such that the first motor 1 drives the drive wheels 400 and the air conditioning compressor 6 simultaneously, that is, the traveling requirement and the temperature regulation requirement are met simultaneously through the first motor 1, while the second motor 2 stops operating to reduce energy consumption. On the other hand, the first transmission path may also be disconnected, such that the first motor 1 and the second motor 2 perform driving independently, that is, the first motor 1 only drives the drive wheels 400, the second motor 2 only drives the air conditioning compressor 6, the drive wheels 400 and the air conditioning compressor 6 operate independently, and the rotation speed of the air conditioning compressor 6 does not need to change with the rotation speed of the drive wheels 400, such that the rotation speed of the drive wheels 400 and the rotation speed of the air conditioning compressor 6 may be regulated respectively according to the traveling requirement and the temperature regulation requirement, and a desirable energy-saving effect is achieved.

According to some embodiments of the present application, a rate of work of the first motor 1 is greater than a rate of work of the second motor 2.

The rate of work of a motor refers to a rate of output work of the motor and is energy that the motor provides to the outside per unit of time. The higher the rate of work of the motor, the higher the rotation speeds of the drive wheels 400 and the air conditioning compressor 6 and the more energy consumed.

By selecting the first motor 1 as a motor with a high rate of work, the first motor 1 may meet the traveling requirement of the vehicle 1000, and may also drive the air conditioning compressor 6 via the first transmission path to meet the high temperature regulation requirement. Meanwhile, by selecting the second motor 2 as a motor with a low rate of work, the size, weight and cost of the second motor

2 are remarkably reduced, the operation energy consumption of the second motor 2 is low, and a desirable energy-saving effect is achieved.

In addition, the second motor 2 stops operating and rests in a case of the high temperature regulation requirement, thereby effectively reducing wear of the second motor 2 and extending the durability of the second motor 2.

On the other hand, by switching the first motor 1 that drives the air conditioning compressor 6 to the second motor 2 to drive the air conditioning compressor 6, primary speed regulation is realized, and the second motor 2 has a low rate of output work and low energy consumption. When the air conditioning compressor 6 is driven independently by the second motor 2, the rotation speed of the air conditioning compressor 6 may be further regulated according to the temperature regulation requirement to realize secondary speed regulation, for example, the rotation speed of the air conditioning compressor 6 is further reduced to meet the low temperature regulation requirement. With the two times of speed regulation, the air conditioning compressor 6 may be regulated and controlled as flexibly as possible to meet the temperature regulation requirement and reduce unnecessary energy consumption.

According to some embodiments of the present application, as shown in FIG. 2, the power drive system 200 further includes a second clutch 4, and the second clutch 4 is disposed in the second transmission path for connection or disconnection of the second transmission path.

As mentioned above, the second transmission path is a path for connecting the first motor 1 with the transmission device 5. The second clutch 4 is a component that connects a driving part with a driven part of the second transmission path and is used for cutting off or transmitting power. When the second clutch 4 is engaged, the first motor 1 transmits power to the transmission device 5 via the second transmission path to drive the drive wheels 400. When the second clutch 4 is disengaged, the second transmission path is disconnected, the first motor 1 may not transmit power to the transmission device 5, and the drive wheels 400 lose power.

In this way, when the second clutch 4 is disengaged, the first motor 1 may drive the air conditioning compressor 6 independently without driving the drive wheels 400, such that the high temperature regulation requirement is met when the vehicle 1000 does not need to travel, unnecessary energy consumption caused by operation (including operation of the transmission device that connects the drive wheels 400 with the second clutch) of the drive wheels 400 is reduced, and the energy-saving effect is achieved.

According to some embodiments of the present application, as shown in FIG. 2, the first transmission path includes a first connection portion 31 and a second connection portion 32 that may be connected or disconnected through the first clutch 3, the first connection portion 31 is in transmission connection to an output end 11 of the first motor, and the second connection portion 32 is in transmission connection to an input end 61 of the air conditioning compressor. The second transmission path includes a third connection portion 41 and a fourth connection portion 42 that may be connected or disconnected through the second clutch 4, the third connection portion 41 is in transmission connection to the output end 11 of the first motor, and the fourth connection portion 42 is in transmission connection to an input end of the transmission device 5.

One of the first connection portion 31 and the second connection portion 32 is the driving part of the first transmission path, and the other is the driven part of the first transmission path. One of the third connection portion 41 and the fourth connection portion 42 is the driving part of the second transmission path, and the other is the driven part of the second transmission path.

For example, the first connection portion 31 is the driving part of the first transmission path and the second connection portion 32 is the driven part of the first transmission path, the first connection portion 31 and the second connection portion 32 are connected through the first clutch 3, and the first motor 1 transmits power to the second connection portion 32 via the first connection portion 31 to finally drive the air conditioning compressor 6.

For another example, the third connection portion 41 is the driving part of the second transmission path, and the fourth connection portion 42 is the driven part of the second transmission path, the third connection portion 41 and the fourth connection portion 42 are connected through the second clutch 4, the first motor 1 transmits power to the fourth connection portion 42 via the third connection portion 41, and finally the power is transmitted to the drive wheels 400 through the transmission device 5.

The first transmission path and the second transmission path are simple in structure, and the first motor 1 may drive at least one of the air conditioning compressor 6 and the drive wheels 400, which may meet the high temperature regulation requirement independently and may also meet the traveling requirement independently.

Figures 3, 4:
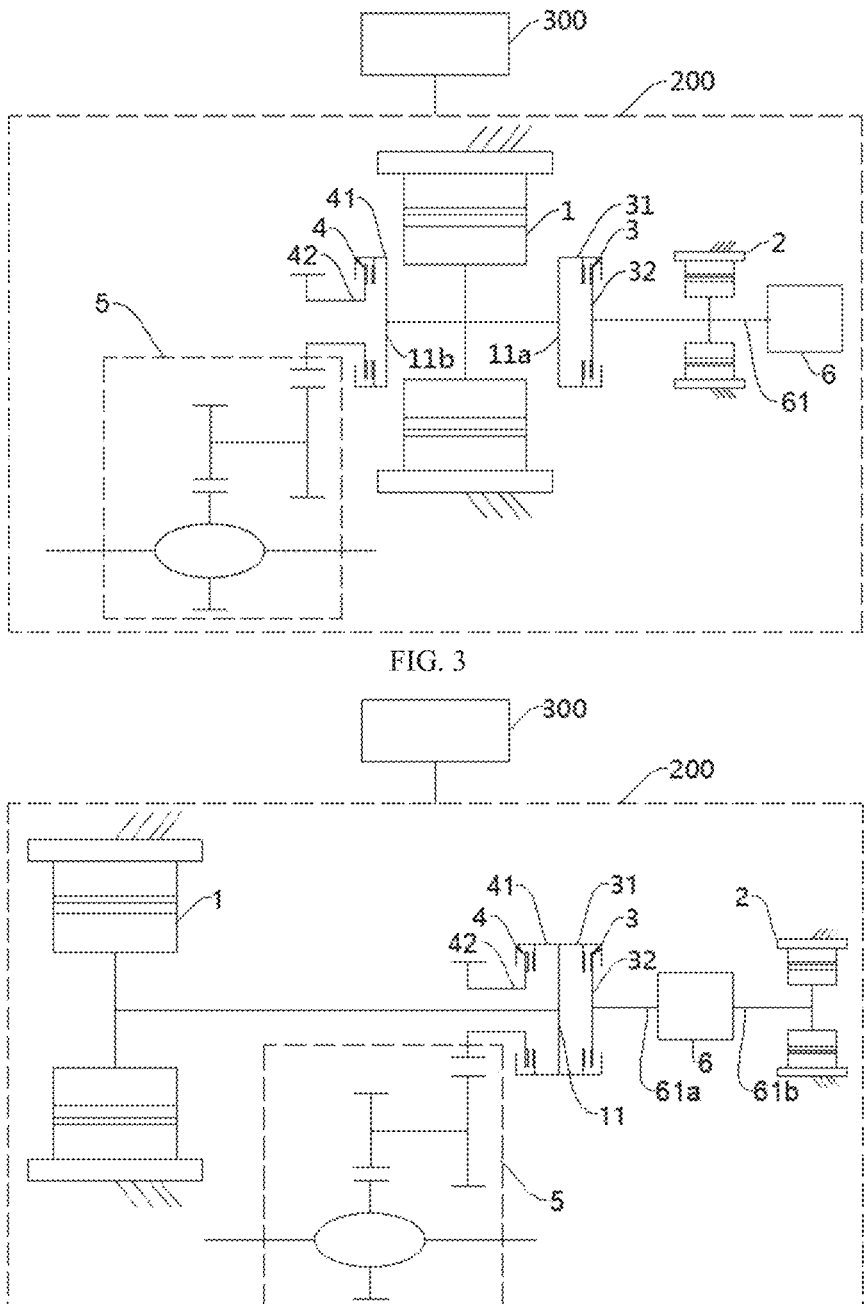
FIG. 3 is a schematic structural diagram of a power drive system according to another embodiment of the present application.
FIG. 4 is a schematic structural diagram of a power drive system according to yet another embodiment of the present application.

According to some embodiments of the present application, as shown in FIG. 3, the first motor 1 includes a first output end 11a and a second output end 11b, the first output end 11a is connected to the first connection portion 31, and the second output end 11b is connected to the third connection portion 41.

As shown in FIG. 3, the first motor 1 has dual output ends, one of which is the first output end 11a and the other is the second output end 11b.

The first output end 11a is connected to the air conditioning compressor 6 via the first transmission path, and the second output end 11b is connected to the drive wheels 400 via the second transmission path. The connection structure is simple, the transmission paths are clear, and control is easy.

In other embodiments, the first motor 1 may also be provided with one output end. As shown in FIG. 2, the first connection portion 31 and the third connection portion 41 are interconnected or integrally formed.

The first connection portion 31 and the third connection portion 41 being interconnected indicates that the first connection portion 31 and the third connection portion 41 are fixedly connected by welding, riveting, etc. The first connection portion 31 and the third connection portion 41 being integrally formed indicates that the first connection portion 31 and the third connection portion 41 form a connected structure by casting, pouring and molding, etc.

The output end 11 of the first motor is connected to the first connection portion 31 and the second connection portion 32 simultaneously, such that the connection structure is effectively simplified, the space occupied by the power drive system 200 is reduced, and the flexible regulation and control over the drive wheels 400 and the air conditioning compressor 6 are not affected.

According to some embodiments of the present application, as shown in FIG. 2, the second connection portion 32 is in transmission connection to the input end 61 of the air conditioning compressor through the second motor 2. Alternatively, as shown in FIG. 4, the air conditioning compressor 6 includes a first input end 61a and a second input end 61b, the first input end 61a is connected to the second connection portion 32, and the second input end 61b is connected to the second motor 2.

Figures 5, 6:
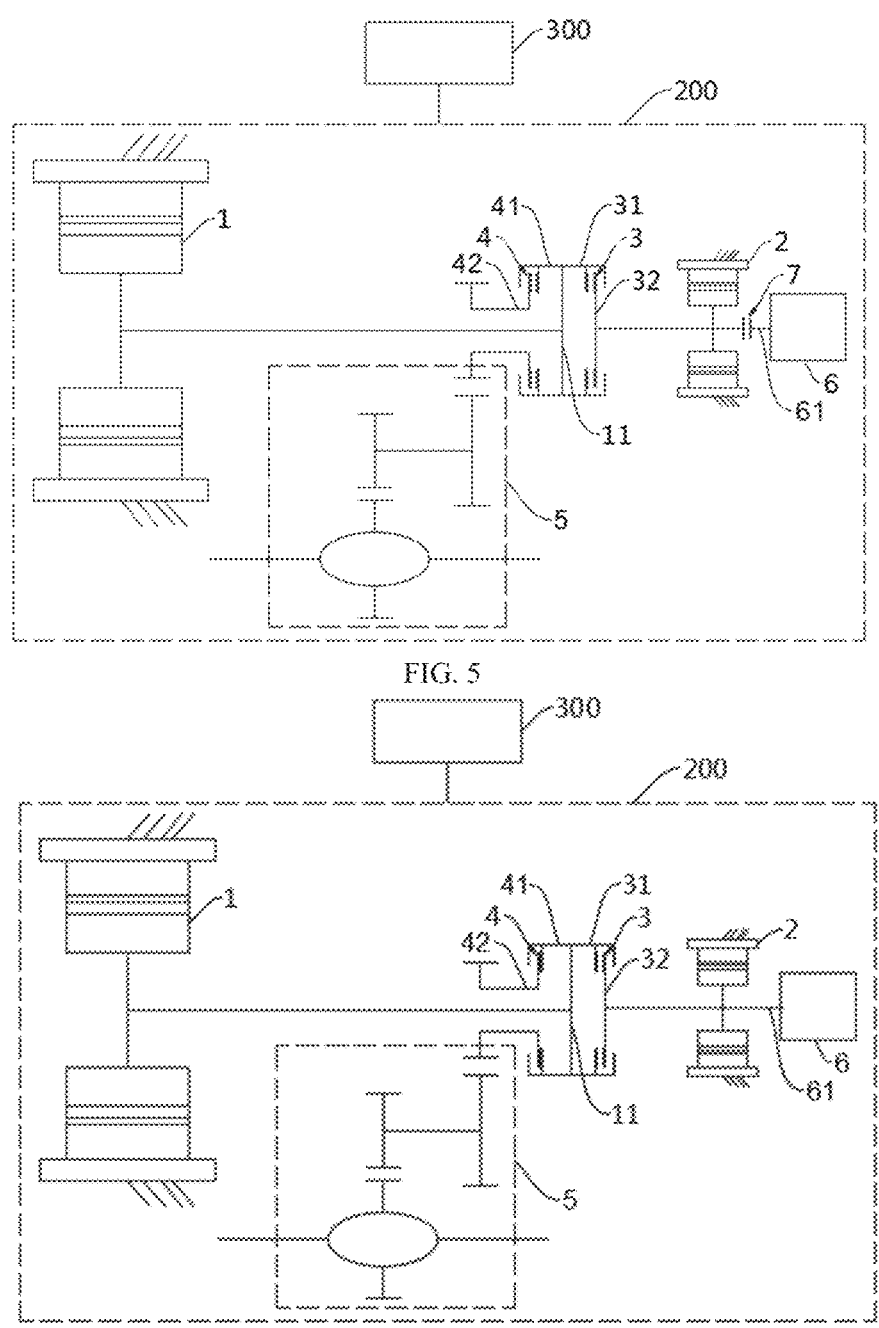
FIG. 5 is a schematic structural diagram of a power drive system according to yet another embodiment of the present application.
FIG. 6 is a state diagram of a first operating mode and a third operating mode of a power drive system according to an embodiment of the present application.

As shown in FIG. 2, in some embodiments, the second connection portion 32 is in transmission connection to the input end 61 of the air conditioning compressor through the second motor 2, that is, the second motor 2 is connected to the first transmission path. In this way, the first motor 1 and the second motor 2 may drive the air conditioning compressor 6 independently, respectively, the first motor 1 and the second motor 2 may drive the air conditioning compressor 6 together, and regulation and control are flexible; moreover, the overall structure is compact and the occupied space is small. Optionally, in a case where the first connection portion 31 and the third connection portion 41 are connected into one, the second connection portion 32 may serve as the driving part of the first transmission path, the first connection portion 31 serves as the driven part of the first transmission path, the third connection portion 41 serves as the driving part of the second transmission path, the fourth connection portion 42 serves as the driven part of the second transmission path, and the power of the second motor 2 is transmitted to the transmission device 5 via the second connection portion 32, the first connection portion 31, the third connection portion 41, and the fourth connection portion 42 in sequence. Thus, the second motor 2 may not only drive the air conditioning compressor 6, but also drive the drive wheels 400 in cooperation with the first motor 1 to play an assisting role and further increase the power of the drive wheels 400. Optionally, as shown in FIG. 5, a third clutch 7 is disposed between the second motor 2 and the input end 61 of the air conditioning compressor, and the third clutch 7 is used for controlling connection and disconnection between the second motor 2 and the air conditioning compressor 6. When the third clutch 7 is disengaged, the second motor 2 may only provide power to the drive wheels 400 without driving the air conditioning compressor 6. In other words, when both the first clutch 3 and the third clutch 7 are engaged, the first transmission path is connected and the air conditioning compressor 6 may be driven by the first motor 1; when the first clutch 3 is disengaged and the third clutch 7 is engaged, the air conditioning compressor 6 may be driven by the second motor 2; and when the first clutch 3 is engaged and the third clutch 7 is disengaged, neither the first motor 1 nor the second motor 2 drives the air conditioning compressor 6, and the second motor 2 provides power to the drive wheels 400 when operating.

As shown in FIG. 4, in other embodiments, the air conditioning compressor 6 is configured to have two input ends, one of which is the first input end 61a and the other is the second input end 61b. The first input end 61a is connected to the second connection portion 32 for connection of the first transmission path, so as to obtain power from the first motor 1, and the second input end 61b is connected to the second motor 2 to obtain power from the second motor 2, such that the first motor 1 and the second motor 2 drive the air conditioning compressor 6 independently, respectively, and the first motor 1 and the second motor 2 drive the air conditioning compressor 6 together. The structure is simple, the power transmission paths are clear, and regulation and control are flexible.

According to some embodiments of the present application, as shown in FIG. 6, the power drive system 200 has a first operating mode. In the first operating mode, the first motor 1 operates, the second motor 2 does not operate, the first clutch 3 is disengaged, the second clutch 4 is engaged, the first motor 1 drives the drive wheels 400, and the air conditioning compressor 6 does not run.

When there is no temperature regulation requirement but only the traveling requirement, the power drive system 200 enters the first operating mode, and the whole vehicle runs without turning on an air conditioner. The first clutch 3 is disengaged to disconnect the first transmission path, the second clutch 4 is engaged to connect the second transmission path, the first motor 1 operates to drive the drive wheels 400 to rotate, and both the second motor 2 and the air conditioning compressor 6 stop operating and rest to reduce energy consumption.

Figures 7, 8:
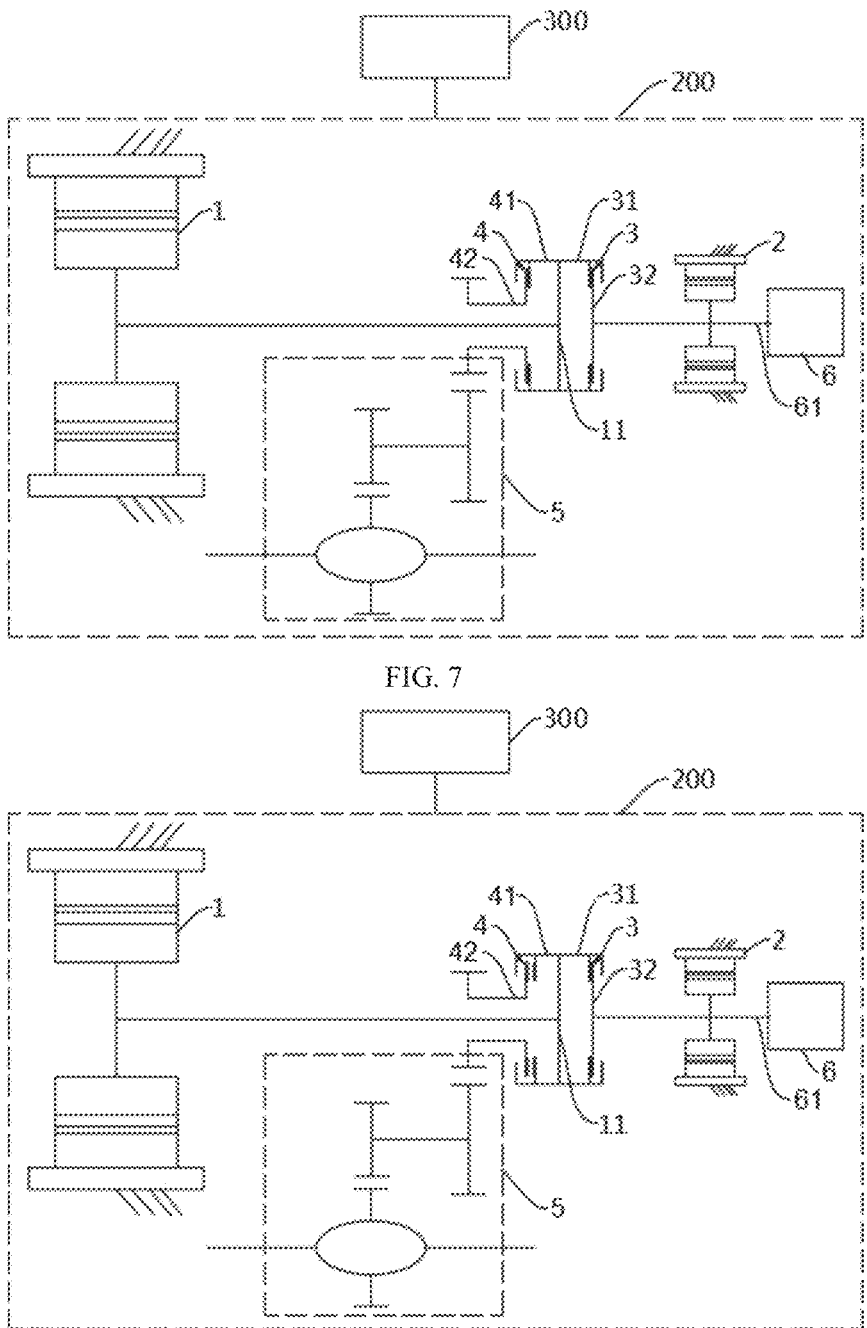
FIG. 7 is a state diagram of a second operating mode of a power drive system according to an embodiment of the present application.
FIG. 8 is a state diagram of a fourth operating mode of a power drive system according to an embodiment of the present application.

According to some embodiments of the present application, as shown in FIG. 7, the power drive system 200 has a second operating mode. In the second operating mode, the first motor 1 operates, the second motor 2 does not operate, both the first clutch 3 and the second clutch 4 are engaged, and the first motor 1 drives the drive wheels 400 and the air conditioning compressor 6.

When there is the high temperature regulation requirement and the traveling requirement simultaneously, the power drive system 200 enters the second operating mode, and the whole vehicle operates at a high speed with forced cooling or forced heating. Both the first clutch 3 and the second clutch 4 are engaged to connect the first transmission path and the second transmission path, the first motor 1 simultaneously drives the air conditioning compressor 6 and the drive wheels 400 to run at a high speed, and the second motor 2 stops operating and rests, thereby relieving wear and reducing energy consumption.

According to some embodiments of the present application, as shown in FIG. 6, the power drive system 200 has a third operating mode. In the third operating mode, both the first motor 1 and the second motor 2 operate, the first clutch 3 is disengaged, the second clutch 4 is engaged, the first motor 1 drives the drive wheels 400, and the second motor 2 drives the air conditioning compressor 6.

The third operating mode has the same transmission path settings as the first operating mode, the difference being that the second motor 2 is in an operating status in the third operating mode. When there is both the traveling requirement and the low temperature regulation requirement, the power drive system 200 enters the third operating mode. The first clutch 3 is disengaged to disconnect the first transmission path, the second clutch 4 is engaged to connect the second transmission path, the first motor 1 operates to drive the drive wheels 400 to rotate, and the second motor 2 drives the air conditioning compressor 6 to run at a relatively low speed, thereby adapting to the low temperature regulation requirement and reduce unnecessary energy consumption.

According to some embodiments of the present application, as shown in FIG. 8, the power drive system 200 has a fourth operating mode. In the fourth operating mode, the first motor 1 operates, the second motor 2 does not operate, the first clutch 3 is engaged, the second clutch 4 is disengaged, and the first motor 1 drives the air conditioning compressor 6.

The fourth operating mode is started when there is no traveling requirement but the high temperature regulation requirement. For example, when the vehicle 1000 is parked and fast charged, the fourth operating mode is started.

Optionally, the vehicle 1000 is further provided with the controller 300 and a fast charging adaptor. The controller 300 is electrically connected to the fast charging adaptor. The fast charging adaptor is provided with a signal sending module. When the fast charging adaptor is connected to a charging pile, a fast charging signal is sent. After receiving the fast charging signal, the controller 300 controls the first clutch 3 to be engaged and the second clutch 4 to be disengaged, controls the first motor 1 and the air conditioning compressor 6 to operate, and controls the second motor 2 to stop operating, such that the first motor 1 only drives the air conditioning compressor 6 to run at a high speed.

With the development of technology, the requirements for a fast charging speed of electric vehicles are getting higher and higher, the fast charging time is getting shorter and shorter, and the heat generation of a battery during fast charging is also getting higher and higher. The overhigh heat generation of the battery is prone to causing ignition and explosion, leading to safety risks. At present, heat dissipation of the battery is achieved generally by compressing and driving a refrigerant in the thermal management system of the battery by the air conditioning compressor. Since the vehicle does not have high cooling requirement during regular running, an existing air conditioning compressor does not have high cooling capacity and may not meet the cooling requirement during fast charging. To solve the problem about cooling during fast charging, a current conventional solution is to adopt a plurality of air conditioning compressors or provide an air conditioning compressor with a high rate of work. In the conventional solution, whether the plurality of air conditioning compressors are provided or the air conditioning compressor with the high rate of work is provided, there are problems that the overall size is large, and the weight, cost and energy consumption are high.

In the embodiment of the present application, the first motor 1 is connected to the air conditioning compressor 6 via the first transmission path, and the first motor 1 is connected to the transmission device 5 via the second transmission path, the first clutch 3 is provided to control connection and disconnection of the first transmission path, and the second clutch 4 is provided to control connection and disconnection of the second transmission path. In the conventional situation of the low temperature regulation requirement, the second motor 2 drives the air conditioning compressor 6 for cooling; in the case of fast charging, the second transmission path is disconnected, the first motor 1 drives the air conditioning compressor 6 for cooling to meet the high temperature regulation requirement, thereby avoiding overheat of the battery 100 and ensuring safety. Moreover, in the technical solution of the present application, since the cooling requirement is met by driving the air conditioning compressor 6 to run at a high speed through the first motor 1 with the high rate of work, the size, weight, cost and energy consumption may not be increased.

According to some embodiments of the present application, as shown in FIG. 2, the power drive system 200 has a fifth operating mode. In the fifth operating mode, the first motor 1 does not operate, the second motor 2 operates, both the first clutch 3 and the second clutch 4 are disengaged, and the second motor 2 drives the air conditioning compressor 6.

When there is no traveling requirement but the temperature regulation requirement, and the temperature regulation requirement is low, the power drive system 200 enters the fifth operating mode. The first clutch 3 and the second clutch 4 are both disengaged to disconnect the first transmission path and the second transmission path. In this case, the second motor 2 independently drives the air conditioning compressor 6, and the rotation speed of the air conditioning compressor 6 is flexibly regulated and controlled according to the temperature regulation requirement in the compartment.

In the fifth operating mode, the vehicle 1000 is parked, the low temperature regulation requirement is met, unnecessary energy consumption is reduced, and the speed may be regulated flexibly.

According to some embodiments of the present application, a vehicle 1000 is provided. The vehicle 1000 includes the above-mentioned power drive system 200. The vehicle 1000 further includes drive wheels 400, an air conditioning system, and a battery 100. The battery 100 is provided with a thermal management system. The drive wheels 400 are used for driving the vehicle 1000 to travel. The air conditioning system is used for regulating a temperature in a compartment. The thermal management system of the battery 100 is used for regulating a temperature of the battery 100. An output end of a transmission device 5 of the power drive system 200 is connected to the drive wheels 400. An air conditioning compressor 6 is connected to the air conditioning system and the thermal management system of the battery 100 to compress and drive a refrigerant to achieve temperature regulation of the compartment and temperature regulation of the battery 100.

According to some embodiments of the present application, as shown in FIG. 2, FIG. 6 to FIG. 8, the present application provides the power drive system 200 for the electric vehicle. The power drive system 200 includes the first motor 1, the second motor 2, the first clutch 3, the second clutch 4, the transmission device 5, and the air conditioning compressor 6. The first motor 1 is in transmission connection to the air conditioning compressor 6 via the first transmission path. The first transmission path includes the first connection portion 31 and the second connection portion 32. The output end 11 of the first motor is connected to the first connection portion 31. The input end 61 of the air conditioning compressor is connected to the second connection portion 32. The first clutch 3 is disposed on the first transmission path for connection or disconnection of the first connection portion 31 and the second connection portion 32. The second motor 2 is connected to the first transmission path and disposed between the second connection portion 32 and the air conditioning compressor 6. The first motor 1 is further in transmission connection to the transmission device 5 via the second transmission path. The second transmission path includes the third connection portion 41 and the fourth connection portion 42. The third connection portion 41 and the first connection portion 31 are connected or integrally formed, such that the third connection portion 41 is connected to the output end 11 of the first motor. The fourth connection portion 42 is connected to the transmission device 5. The transmission device 5 is used for being connected to the drive wheels 400 of the vehicle 1000. The second clutch 4 is disposed on the second transmission path for connection or disconnection of the third connection portion 41 and the fourth connection portion 42. In the power drive system 200 according to the embodiment of the present application, connection and disconnection of the first transmission path are controlled by the first clutch 3, connection and disconnection of the second transmission path are controlled by the second clutch 4, and the first motor 1 and the second motor 2 are controlled to operate and stop respectively, such that the first motor 1 and the second motor 2 drive the drive wheels 400 and the air conditioning compressor 6 independently, respectively, or the first motor 1 and the second motor 2 drive the drive wheels 400 together, or the first motor 1 and the second motor 2 drive the air conditioning compressor 6 together, or one of the first motor 1 and the second motor 2 drives the drive wheels 400 and the air conditioning compressor 6 simultaneously. Regulation and control are flexible, strategies may be adjusted according to the temperature regulation requirement and the traveling requirement, and a desirable energy-saving effect is achieved.

The above description is only preferred embodiments of the present application, and is not intended to limit the present application. For a person skilled in the art, various changes and variations may be made to the present application. Any modification, equivalent replacement, improvement, etc. made within the spirit and principles of the present application may fall within the scope of protection of the present application.

What is claimed is:

1. A power drive system for a vehicle, comprising a first motor, a second motor, a first clutch, a transmission structure, and an air conditioning compressor, the first motor being in transmission connection to the air conditioning compressor via a first transmission path, the second motor also being in transmission connection to the air conditioning compressor;

the first motor being further in transmission connection to the transmission structure via a second transmission path for transmitting power of the first motor to drive wheels of the vehicle;

the first clutch being disposed on the first transmission path for connection or disconnection of the first transmission path, wherein the power drive system further comprises a second clutch, and the second clutch is disposed in the second transmission path for connection or disconnection of the second transmission path, the first transmission path comprises a first connection portion and a second connection portion that can be connected or disconnected through the first clutch, the first connection portion is in transmission connection to an output end of the first motor, and the second connection portion is in transmission connection to an input end of the air conditioning compressor, the second transmission path comprises a third connection portion and a fourth connection portion that can be connected or disconnected through the second clutch, the third connection portion is in transmission connection to the output end of the first motor, and the fourth connection portion is in transmission connection to an input end of the transmission structure, and the first connection portion and the third connection portion are directedly interconnected or integrally formed.

2. The power drive system according to claim 1, wherein a rate of work of the first motor is greater than a rate of work of the second motor.

3. The power drive system according to claim 1, wherein the first motor comprises a first output end and a second output end, the first output end is connected to the first connection portion, and the second output end is connected to the third connection portion.

4. The power drive system according to claim 1, wherein the second connection portion is in transmission connection to the input end of the air conditioning compressor through the second motor, or, the air conditioning compressor comprises a first input end and a second input end, the first input end is connected to the second connection portion, and the second input end is connected to the second motor.

5. The power drive system according to claim 1, wherein the power drive system is configured to perform a first operating mode; and in the first operating mode, the first motor operates, the second motor does not operate, the first clutch is disengaged, the second clutch is engaged, the first motor drives the drive wheels, and the air conditioning compressor does not run.

6. The power drive system according to claim 5, wherein the power drive system is configured to perform a second operating mode; and in the second operating mode, the first motor operates, the second motor does not operate, both the first clutch and the second clutch are engaged, and the first motor drives the drive wheels and the air conditioning compressor.

7. The power drive system according to claim 6, wherein the power drive system is configured to perform a third operating mode; and in the third operating mode, both the first motor and the second motor operate, the first clutch is disengaged, the second clutch is engaged, the first motor drives the drive wheels, and the second motor drives the air conditioning compressor.

8. The power drive system according to claim 7, wherein the power drive system is configured to perform a fourth operating mode; and in the fourth operating mode, the first motor operates, the second motor does not operate, the first clutch is engaged, the second clutch is disengaged, and the first motor drives the air conditioning compressor.

9. The power drive system according to claim 8, wherein the power drive system is configured to perform a fifth operating mode; and in the fifth operating mode, the first motor does not operate, the second motor operates, both the first clutch and the second clutch are disengaged, and the second motor drives the air conditioning compressor.

10. The power drive system according to claim 8, wherein the power drive system further comprises a controller configured to control the power drive system to enter the fourth operating mode under a condition that the vehicle is parked and fast charged, and in the fourth operating mode, the first motor operates, the second motor does not operate, the first clutch is engaged, the second clutch is disengaged, and the first motor drives the air conditioning compressor.

11. The vehicle, comprising the power drive system according to claim 1.

* * * * *